Jan. 19, 1965     G. BAYARD     3,165,890
ARRANGEMENT FOR PREVENTING ANY RECYCLING OF GASES INTO
THE STARTING TURBINE OF AIRCRAFTS CARRYING
THE JET ENGINE INSIDE THE FUSELAGE
Filed May 7, 1962

Gaston Bayard
INVENTOR.

BY *Irvin S. Thompson*

ATTORNEY

United States Patent Office 3,165,890
Patented Jan. 19, 1965

3,165,890
ARRANGEMENT FOR PREVENTING ANY RE-
CYCLING OF GASES INTO THE STARTING
TURBINE OF AIRCRAFTS CARRYING THE
JET ENGINE INSIDE THE FUSELAGE
Gaston Bayard, Toulouse, Haute-Garonne, France, assignor to Technopatent, Paris, France, a company of France
Filed May 7, 1962, Ser. No. 192,721
Claims priority, application France, June 2, 1961, 4,720
3 Claims. (Cl. 60—39.14)

My invention has for its object an arrangement adapted to prevent any recycling of the burnt gases into the starting turbine for aircrafts carrying the jet engine inside the fuselage.

It is a known fact that in such aircrafts the air is fed through two air intakes arranged symmetrically and opening into the feed channel.

Under such conditions, there is normally secured inside the fuselage, a vertical medial partition between said intakes, so as to prevent any defective feeding of air into the jet engine when a dissymmetry arises between the two air intakes.

My invention resorts to the presence of said medial partition for preventing during the starting of the reactor, the recycling of the burnt gases into the starting turbine which leads to the extinction of the gas turbine which serves for starting purposes in its initial stage, during which the jet engine does not revolve or revolves only at a slow speed and cannot ensure the entrance of fresh air inside the feed channel.

My invention allows cutting out said recycling in two different manners which are both applicable to aircrafts provided with the above-mentioned medial partition, to wit:

The fitting of one or more intakes of fresh air solely to one side of the partition and in registry with the suction end of the compressor of the starting gas turbine and of one or more outputs for the burnt gases arranged solely on the opposite side of said partition, on the downstream end of the starting gas turbine.

The use of the actual partition feeding the fresh air, and for removing the hot burnt gases, as provided by inserting in said partition suitably arranged channels.

Figure 1:
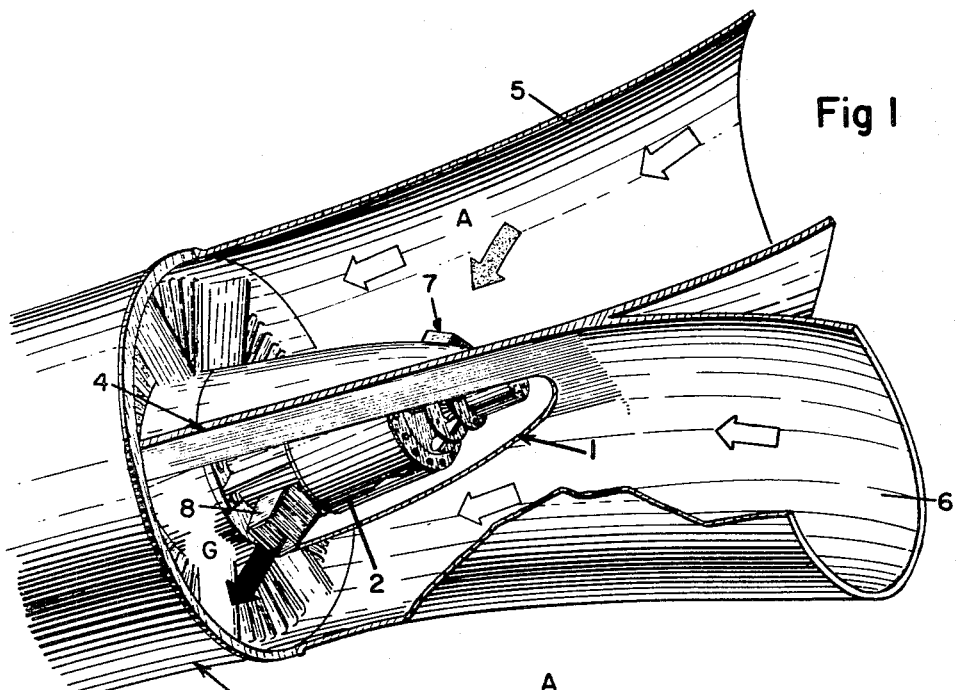
Figure 2:
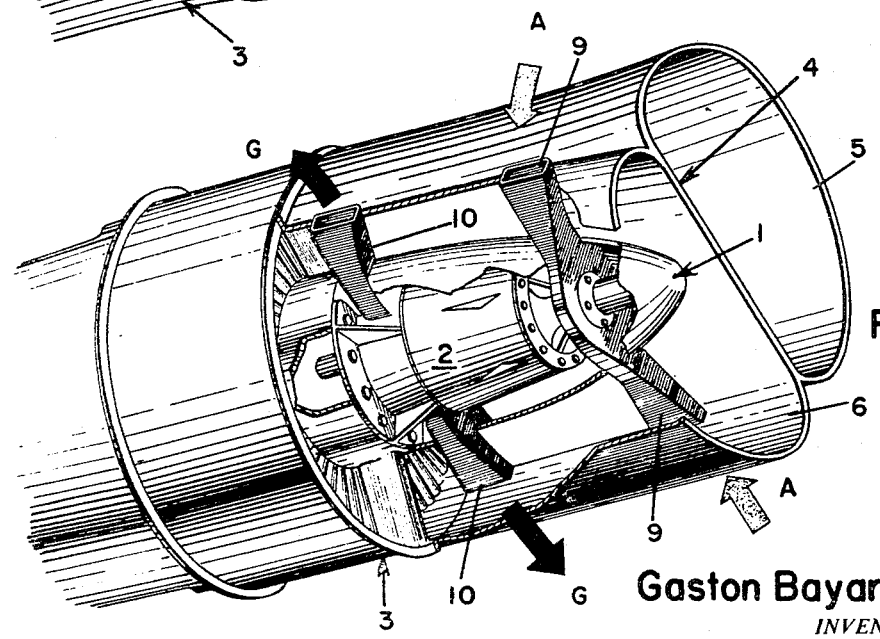

The advantages and improvements obtained in accordance with my invention will appear from the reading of the following description of two embodiments thereof disclosed solely by way of example and by no means in a limiting sense. Said embodiments are illustrated in the accompanying drawings wherein:

FIG. 1 is a diagrammatic plan view of the first embodiment of the arrangement proposed, FIG. 2 is a vertical longitudinal cross-sectional view of the second embodiment.

As illustrated in FIG. 1, the fairing 1 encloses the starting gas turbine 2, feeding its exhaust gases into the atmosphere; a medial partition 4 separates the air intakes 5 and 6 for the jet engine 3 and there is arranged furthermore in conformity with my invention an input 7 for air A into the starting engine out of the intake 5, to one side of the partition 4 extending inside the fairing at a point ahead of the turbine 2, whereas the output 8 for the burnt gases G is provided on the other side of the partition 4 and fairing 1 on the downstream side of the starting gas turbine.

Obviously, upon inspection of the drawing, it will be seen that my improved arrangement of the air intake and of the gas output of the gases on opposite sides of a medial partition cuts out any possibility of recycling the burnt gases into the starting turbine, in particular during the starting stage.

An arrangement producing the same result is illustrated diagrammatically in FIG. 2 where the parts illustrated in FIG. 1 and which act in the same manner carry the same reference numbers. In said FIG. 2, the operative channels leading into and out of the starting turbine are provided symmetrically inside the actual partition 4; one set of channels 9, 9' opens into the air inlet port of the compressor of the gas turbine, so as to suck air A from the air intakes of the jet engine, while another set of channels 10, 10' formed in the partition 4 on the downstream end of the starting gas turbine 2, allows rejecting the exhaust gases G also outside the air stream, said arrangement preventing unfailingly any recycling of gases into the turbine during the starting operation.

Obviously, without unduly widening the scope of the invention as defined in the accompanying claims, it is possible to provide inside the medial partition 4 solely the air feeding channels 9 and 9', or only the channels 10 and 10' for the exhaust of the burnt gases, or again both sets of channels may be provided simultaneously as in the case illustrated.

The preceding description must not by any means be considered as having a limiting sense both as to the nature of the material to be used in the execution of the arrangement, as to the number, shape, size, proportions and relative position of the different components of the arrangement.

It is possible to resort to any material and to any means or methods which have not been expressly disclosed without widening unduly thereby the scope of the invention as defined in said accompanying claims.

What I claim is:

1. In an aircraft comprising a jet engine, a fairing therefor and two juxtaposed air intakes the rear ends of which are separated by a medial partition, fitted over the fairing, the combination of a gas turbine engine carried inside the fairing and including a compressor, means feeding fresh air into said turbine engine compressor to one side of the partition, and means exhausting the burnt gases out of said turbine engine to the other side of the partition.

2. In an aircraft comprising a jet engine, a fairing therefor forming two juxtaposed air intakes the rear ends of which are separated by a medial partition, fitted over the fairing, the combination of a gas turbine engine carried inside the fairing and including a compressor, means feeding fresh air into said turbine engine compressor out of one air intake, and means exhausting the burnt gases out of said turbine engine into the other air intake to the rear of last-mentioned means.

3. In an aircraft comprising a jet engine and a fairing therefor, forming two juxtaposed air intakes the rear ends of which are separated by a medial partition, fitted over the fairing, the combination of a gas turbine engine fitted inside the fairing and including a compressor, means provided within the partition for feeding fresh air into said turbine engine compressor from one side of the partition and means provided within the partition for exhausting the burnt gases out of said turbine engine to the other side of the partition.

References Cited by the Examiner
UNITED STATES PATENTS

| | | | |
|---|---|---|---|
| 2,652,685 | 9/53 | Willgoos | 60—39.14 |
| 2,720,750 | 10/55 | Schelp | 60—35.6 |
| 2,914,918 | 12/59 | Kaplan | 60—39.14 |
| 2,994,194 | 8/61 | Volk | 60—39.14 |

FOREIGN PATENTS 836,836  6/60  Great Britain.

OTHER REFERENCES

Schneider: (German printed application) December 4, 1958.

SAMUEL LEVINE, *Primary Examiner*.